(12) United States Patent
Fujimoto et al.

(10) Patent No.: US 6,890,991 B2
(45) Date of Patent: May 10, 2005

(54) THERMOPLASTIC RESIN COMPOSITION

(75) Inventors: Hideyuki Fujimoto, Otake (JP); Atsunori Koshirai, Otake (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 30 days.

(21) Appl. No.: 10/221,180

(22) PCT Filed: Mar. 21, 2001

(86) PCT No.: PCT/JP01/02214

§ 371 (c)(1),
(2), (4) Date: Sep. 20, 2002

(87) PCT Pub. No.: WO01/70887

PCT Pub. Date: Sep. 27, 2001

(65) Prior Publication Data

US 2003/0088026 A1 May 8, 2003

(30) Foreign Application Priority Data

Mar. 21, 2000 (JP) ........................ 2000-079131

(51) Int. Cl.[7] .............................................. C08L 27/12
(52) U.S. Cl. ..................... 525/199; 267/268; 267/543; 267/599; 267/601; 267/605; 267/606; 267/609; 525/100; 525/901; 525/431; 525/445; 525/446; 525/464; 525/468
(58) Field of Search ................................ 524/267, 268, 524/599, 601, 605, 606, 609, 543, 266; 525/431, 446, 100, 464, 445, 468, 199, 901, 57, 191, 416, 421, 466

(56) References Cited

U.S. PATENT DOCUMENTS 6,025,441 A 2/2000 Koshirai et al.
6,297,303 B1 * 10/2001 Kobayashi et al. ......... 524/263
2002/0161120 A1 * 10/2002 Chapman et al. ........... 525/165
2004/0143068 A1 * 7/2004 Honda et al. ............... 525/199

FOREIGN PATENT DOCUMENTS

| EP | 166187 | | 1/1988 |
|---|---|---|---|
| EP | 626424 A1 | * | 11/1994 |
| EP | 0 822 228 | | 2/1998 |
| JP | 11-199733 | | 7/1999 |
| JP | 11-209549 | | 8/1999 |
| JP | 2000-226523 | | 8/2000 |
| JP | 2000-297187 | | 10/2000 |

* cited by examiner

*Primary Examiner*—Margaret G. Moore
*Assistant Examiner*—Marc S Zimmer
(74) *Attorney, Agent, or Firm*—Oblon, Spivak, McClelland, Maier & Neustadt, P.C.

(57) ABSTRACT

The present invention relates to a thermoplastic resin composition which has an improved impact resistance while maintaining mechanical properties such as strength and rigidity. In the present invention, a thermoplastic resin (A) is mixed with a polytetrafluoroethylene-containing mixed powder (B) consisting of a polytetrafluoroethylene (b1) having a particle diameter of 10 μm or less and an organic polymer (b2). In this case, the polytetrafluoroethylene-containing mixed powder (B) is mixed so that the amount of a polytetrafluoroethylene component is from 0.0001 to 20 parts by weight based on 100 parts by weight of the thermoplastic resin (A), and a polymer having an epoxy group was used as the organic polymer (b2). The thermoplastic resin composition of the present invention can be widely used in the fields of automotive parts, electric and electronic parts, and precision instrument parts.

6 Claims, No Drawings

THERMOPLASTIC RESIN COMPOSITION

TECHNICAL FIELD

The present invention relates to a thermoplastic resin composition which has an improved impact resistance while maintaining mechanical properties such as strength and rigidity.

This application is based on Japanese Patent Application No. 2000-79131, filed in Japan, the content of which is incorporated herein by reference.

BACKGROUND ART

Thermoplastic resins have been widely used in the fields of automotive parts, electrical and electronic parts, and precision instrument parts because they are superior in ease of processing, mechanical properties, and physical and chemical properties.

However, because the impact strength of the thermoplastic resin is low, improvement is required.

Many proposals have been made to improve the impact strength of the thermoplastic resin. Among these proposals, a method of mixing a silicone-acrylic composite rubber prepared by grafting a vinyl monomer having an epoxy group described in Japanese Patent No. 264113 is a relatively superior method.

However, this method has a drawback in that superior intrinsic properties such as rigidity and heat resistance of the thermoplastic resin are impaired when mixing a rubber in an amount required to obtain a high impact strength.

DISCLOSURE OF THE INVENTION

The present invention has been made to solve the problems described above, and an object thereof is to provide a resin composition, which has improved impact strength, by the addition of a smaller amount of a rubber component while maintaining excellent intrinsic properties such as rigidity and heat resistance of the thermoplastic resin.

To achieve the above object, the present inventors have intensively reaserched and have found that the impact strength is markedly improved by the addition of a small amount of a rubber component when adding a polytetrafluoroethylene-containing mixed powder comprising polytetrafluoroethylene particles having a particle diameter of 10 µm or less and an organic polymer having an epoxy group to a thermoplastic resin. Thus, the present invention has been completed.

The gist of the present invention lies in a thermoplastic resin composition comprising a thermoplastic resin (A) and a polytetrafluoroethylene-containing mixed powder (B) consisting of a polytetrafluoroethylene (b1) having a particle diameter of 10 µm or less and an organic polymer (b2), wherein the polytetrafluoroethylene-containing mixed powder (B) is mixed so that the amount of the polytetrafluoroethylene component is from 0.0001 to 20 parts by weight based on 100 parts by weight of the thermoplastic resin (A), and the organic polymer (b2) has an epoxy group.

In that case, the organic polymer is preferably a rubber-like polymer having an epoxy group.

Furthermore, the rubber-like polymer is preferably a polyorganosiloxane graft copolymer which is prepared by graft-polymerizing a composite rubber comprising a polyorganosiloxane rubber and a polyalkyl (meth)acrylate rubber with one or more vinyl monomers containing at least one epoxy group-containing vinyl monomer.

The thermoplastic resin (A) preferably contains, as a main component, one or more thermoplastic resins selected from polyester resin, polyamide resin, polyarylene sulfide resin, and polyolefin resin.

BEST MODE FOR CARRYING OUT THE INVENTION

Various resins can be employed as the thermoplastic resin (A) used in the present invention, and are preferably those containing, as a main component, one or more thermoplastic resins selected from polyester resin, polyamide resin, polyarylene sulfide resin, and polyolefin resin.

As used herein, the polyester resin refers to a polyester resin obtained by the polycondensation reaction of one or more dicarboxylic acids selected from terephthalic acid, isophthalic acid, naphthalenedicarboxylic acid, 4,4'-diphenyldicarboxylic acid, diphenyletherdicarboxylic acid, α, β-bis (4-carboxyphenoxy)ethane, adipic acid, sebacic acid, azelaic acid, decanedicarboxylic acid, dodecanedicarboxylic acid, cyclohexanedicarboxylic acid and dimer acid, or ester-forming derivarives thereof, and one or more glycols selected from ethylene glycol, propylene glycol, butanediol, pentanediol, neopentyl glycol, hexanediol, octanediol, decanediol, cyclohexane dimethanol, hydroquinone, bisphenol A, 2,2-bis(4'-hydroxyethoxyphenyl)propane, xylene glycol, polyethylene ether glycol, polytetrafluoroethylene ether glycol, and aliphatic polyester oligomer having a hydroxyl group at both terminals. The polyester resin may be either a homopolyester or a copolyester. In addition to the compounds described above, as the comonomer component constituting the copolyester, for example, a hydroxycarboxylic acid such as glycolic acid, hydroxy acid, hydroxybenzoic acid, hydroxyphenylacetic acid or naphthylglycolic acid, and a lactone compound such as propiolactone, butyrolactone, caprolactone or valerolactone can be used. A polyester having a branched or crosslinked structure, which uses a polyfunctional ester-forming component such as trimethylolpropane, trimethylolethane, pentaerythritol, trimellitic acid, trimesic acid or pyromellitic acid, may be used as long as it can maintain the thermoplasticity. It also includes a polyester copolymer containing a halogen, which has, as a substituent, a halogen compound in aromatic carbons and uses a compound having an ester-forming group such as dibromoterephthalic acid, tetrabromoterephthalic acid, tetrachloroterephthalic acid, 1,4-dimethyloltetrabromobenzene, tetrabromobisphenol A, or an ethylene or propylene oxide adduct of tetrabromobisphenol A. Also a polyester elastomer constituting a block copolymer of a high-melting point segment and a low-melting point segment can be used. The polyester elastomer includes, for example, a block copolymer of a hard segment composed mainly of an alkyl terephthalate unit and a soft segment composed of an aliphatic polyester or polyether. As the component (A), these polyester resins can be used alone or in combination thereof. Particularly preferred polyester resins include polybutylene terephthalate, polyethylene terephthalate, and a copolymer composed thereof as a main repeating unit. Examples of the comonomer component constituting the copolymer include isophthalic acid, bisphenol A, 2,2-bis(β-hydroxyethoxyphenyl)propane and 2,2-bis(β-hydroxyethoxytetrabromophenyl)propane.

The polyamide resin is not specifically limited and may be amino acid lactam, or an entire polymer composed of diamine and dicarboxylic acid, which can be subjected to melt polymerization and melt processing.

Specific examples of the polyamide resin used in the present invention include the following resins. They are (1)

polycondensates of an organic dicarboxylic acid having 4 to 12 carbon atoms and an organic diamine having 2 to 13 carbon atoms, for example, polyhexamethyleneadipamide [6,6 nylon] as a polycondensate of hexamethylenediamine and adipic acid, polyhexamethyleneazelamide [6,9 nylon] as a polycondensate of hexamethylenediamine and azelaic acid, polyhexamethylenesebacamide [6,10 nylon] as a polycondensate of hexamethylenediamine and sebacic acid, polyhexamethylenedecanoamide [6,12 nylon] as a polycondensate of hexamethylenediamine and dodecanedioic acid, and polybis(4-aminocyclohexyl)methanedodecane as a polycondensate of bis-p-aminocyclohexylmethane and dodecanedioic acid; (2) polycondensates of ω-amino acid, for example, polyunedecaneamide [11 nylon] as a polycondensate of ω-aminoundecanoic acid; and (3) ring-opening polymerization products of lactam, for example, polycapramide [6 nylon] as a ring-opening polymerization product of ε-aminocaprolactam and polylauric lactam [12 nylon] as a ring-opening polymerization product of ε-aminolaurolactam. Among these resins, polyhexamethyleneadipamide (6,6 nylon), polyhexamethyleneazelamide (6,9 nylon) and polycapramide (6 nylon) are preferably used.

In the present invention, a polyamide resin prepared from adipic acid, isophthalic acid, and hexamethylenediamine can also be used. Furthermore, a blend of two or more polyamide resins such as a mixture of 6 nylon and 6,6 nylon can be used.

The polyamide (1) can be prepared, for example, by the polycondensation of an organic dicarboxylic acid having 4 to 12 carbon atoms and an organic diamine having 2 to 13 carbon atoms in an equimolar ratio. If necessary, the organic dicarboxylic acid can be used in an amount larger than that of the organic diamine so that carboxyl groups in the polyamide resin are in excess of the amino groups. Conversely, the organic dicarboxylic acid can be used in an amount smaller than that of the organic diamine so that amino groups in the polyamide resin are in excess of the carboxyl groups.

Specific examples of the organic dicarboxylic acid include adipic acid, pimelic acid, suberic acid, sebacic acid and dodecanoic diacid. Specific examples of the organic diamine include hexamethylenediamine and octamethylenediamine.

In the same manner as described above, the polyamide resin (1) can be prepared from a derivative capable of producing carboxylic acid such as ester or carboxylic acid chloride, and a derivative capable of producing amine such as amine salt.

The polyamide resin (2) can be prepared, for example, by polycondensing a ω-amino acid with heating in the presence of a small amount of water. Usually, a small amount of a viscosity stabilizer such as acetic acid is added.

The polyamide resin (3) can be prepared, for example, by performing ring-opening polymerization of a lactam with heating in the presence of a small amount of water. Generally, a small amount of a viscosity stabilizer such as acetic acid is added.

The polyarylene sulfide resin, which can be used in the present invention, is a polymer having, as a main constituent unit, a repeating unit represented by the general formula: —(Ar—S)— and may be composed only of a straight-chain structure, and may have a crosslinked structure as long as it has melt processability. In the above general formula, Ar represents a group represented by the following formula or at least one group having 1 to 8 substituents such as halogen or methyl group on the aromatic ring.

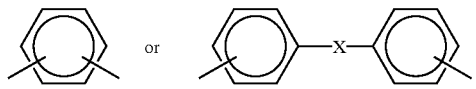

wherein X represents —SO$_2$—, —CO—, —O—, or a main-chain alkylene group having 1 to 5 carbon atoms, which may have a lower alkyl side chain.

Examples of the polyolefin resin used in the present invention include those containing, as a main component, a homopolymer or copolymer of an olefin monomer obtained by radical polymerization or ion polymerization, a copolymer of a larger amount of an olefin monomer and a smaller amount of a vinyl monomer, or a copolymer of an olefin monomer and a diene monomer. These polyolefin resins are used alone or in combination. Conventionally known catalysts such as a Ziegler catalyst, chrome catalyst and metallocene catalyst are used.

Examples of the olefin monomer as used herein include ethylene, propylene, butene-1, hexene-1, decene-1, octene-1 and 4-methyl-pentene-1. Among these olefin monomers, ethylene and propylene are particularly preferred. Specific examples of the homopolymer or copolymer of the olefin monomer include low density polyethylene, ultra-low-density polyethylene, ultra-super-low density polyethylene, linear low density polyethylene, high density polyethylene, ultrahigh molecular weight polyethylene, polypropylene, ethylene-propylene copolymer, polymethylpentene and polybutene. These olefin polymers are used alone or in combination. Among these olefin monomers, a polyolefin resin containing, as a main component, a mixture of two or more kinds selected from the group consisting of polyethylene, polypropylene and ethylene-propylene copolymer is particularly preferred.

It is necessary that the polytetrafluoroethylene-containing mixed powder (B) used in the present invention comprise a polytetrafluoroethylene (b1) having a particle diameter of 10 μm or less and an organic polymer (b2), and that polytetrafluoroethylene not be in the form of an agglomerate having a particle diameter of 10 μm of more than in the powder and the organic polymer is a polymer having an epoxy group.

As the polytetrafluoroethylene-containing mixed powder, preferred are the following polytetrafluoroethylene-containing mixed powders (i) to (iii):

(i) polytetrafluoroethylene-containing mixed powder obtained by mixing an aqueous dispersion of polytetrafluoroethylene particles having a particle diameter of 0.05 to 1.0 μm with an aqueous dispersion of organic polymer particles and solidifying the mixture or powderizing the mixture using a spray drying means;

(ii) polytetrafluoroethylene-containing mixed powder obtained by polymerizing a monomer constituting an organic polymer in the presence of an aqueous dispersion of polytetrafluoroethylene particles having a particle diameter of 0.05 to 1.0 μm and solidifying the mixture or powderizing the mixture using a spray drying means; and (iii) polytetrafluoroethylene-containing mixed powder obtained by emulsion-polymerizing a monomer having an ethylenically unsaturated bond in a mixed dispersion of an aqueous dispersion of polytetrafluoroethylene particles having a particle diameter of 0.05 to 1.0 μm and aqueous dispersion of organic polymer particles and solidifying the mixture or powderizing the mixture using a spray drying means.

The aqueous dispersion of polytetrafluoroethylene particles having a particle diameter of 0.05 to 1.0 μm used to obtain the polytetrafluoroethylene-containing mixed powder (B) used in the present invention is obtained by polymerizing a tetrafluoroethylene monomer by means of the emulsion polymerization using a fluorine-containing surfactant.

During the emulsion polymerization of polytetrafluoroethylene particles, a fluorine-containing olefin such as hexafluoropropylene, chlorotrifluoroethylene, fluoroalkylethylene or perfluoroalkyl vinyl ether and a fluorine-containing alkyl (meth)acrylate such as perfluoroalkyl (meth)acrylate can be used as a copolymerization component as long as properties of polytetrafluoroethylene are not impaired. The content of the copolymerization component is preferably 10% by weight or less based on tetrafluoroethylene.

Typical examples of the commercially available raw material of the polytetrafluoroethylene particle dispersion include "Fluon AD-1" and "Fluon AD936" manufactured by Asahi Fluoropolymers Co., Ltd.; "Polyflon D-1" and "Polyflon D-2" manufactured by Daikin Industries, Ltd.; and "Teflon 30J" manufactured by Du Pont-Mitsui Fluorochemicals Co., Ltd.

The organic polymer (b2) used to obtain the polytetrafluoroethylene-containing mixed powder (B) used in the present invention is a polymer having an epoxy group and is not specifically limited as long as it is effective to improve the impact strength of the thermoplastic resin. The organic polymer is particularly preferably a rubber-like polymer.

The rubber-like polymer refers to a polymer which is in the form of rubber at room temperature and preferably has a glass transition temperature of −20° C. or less. Specific examples thereof include is a diene copolymer such as polybutadiene, polyisoprene, ethylene-propylene-ethylidene norbornene copolymer, ethylene-propylene-dicyclopentadiene copolymer, ethylene-propylene-5-ethylidene-2-norbornene copolymer, acrylonitrile-butadiene copolymer or isoprene-isobutylene copolymer; a acrylic rubber such as a copolymer of n-butyl acrylate and an acrylate ester monomer capable of copolymerizing with n-butyl acrylate; a silicone rubber including dimethylsiloxane unit as a main componet; and silicone-acrylic composite rubber of silicone and acrylate. Among these rubbers, a silicone-acrylic composite rubber is preferred.

When the organic polymer is a polymer having an epoxy group, the dispersibility in the thermoplastic resin (A) can be improved. As the rubber-like polymer having an epoxy group, for example, core-shell particles having an epoxy group or an elastomer having an epoxy group can be used.

As used herein, the core-shell particles having an epoxy group refer to a copolymer obtained by polymerizing an epoxy group-containing vinyl monomer and, if necessary, the other copolymerizable vinyl monomer in the presence of the rubber-like polymer.

Examples of the elastomer having an epoxy group include straight-chain copolymers such as ethylene-glycidyl methacrylate copolymer and ethylene-vinyl acetate-glycidyl methacrylate copolymer; and graft copolymer composed of the straight-chain copolymer as a main chain and polystyrene or methyl polymethacrylate as a side chain.

Among these rubber-like polymers, particularly preferred is a polyorganosiloxane polymer obtained by graft-polymerizing a composite rubber composed of a polyorganosiloxane rubber and a polyalkyl (meth)acrylate rubber with one or more vinyl monomers containing at least one epoxy group-containing vinyl polymer.

The content of polytetrafluoroethylene in the polytetrafluoroethylene-containing mixed powder (B) used in the present invention is preferably from 0.1 to 90% by weight.

In the resin composition of the present invention, the polytetrafluoroethylene-containing mixed powder (B) consisting of a polytetrafluoroethylene (b1) having a particle diameter of 10 $\mu$m or less and an organic polymer (b2) is mixed in an amount of polytetrafluoroethyrene of 0.0001 to 20 parts by weight based on 100 parts by weight of the thermoplastic resin (A). When the amount is less than 0.0001 parts by weight, the effect of improving the impact strength is poor. On the other hand, when the amount exceeds 20 parts by weight, the fluidity during melting is lowered too much.

As long as original purposes are not impaired, more desired physical properties and characteristics can be obtained by appropriately mixing the resin composition of the present invention with various additives, for example, pigments and dyes; reinforcers and fillers, such as glass fibers, metal fibers, metal flakes and carbon fibers; phenol antioxidants such as 2,6-di-butyl-4-methylphenol and 4,4'-butylidene-bis(3-methyl-6-t-butylphenol); phosphite antioxidants such as tris(mixed, mono and diphenyl) phosphites and diphenylisodecyl phosphite; sulfur antioxidants such as dilauryl thiodipropionate, dimyristyl thiodipropionate and distearyl thiodipropionate; benzotriazole ultraviolet absorbers such as 2-hydroxy-4-octoxybenzophenone and 2-(2-hydroxy-5-methylphenyl)benzotriazole; photostabilizers such as bis(2,2,6,6)-tetramethyl-4-piperidinyl; electostatic agents such as hydroxyalkylamine and sulfonic acid salt; lubricants such as ethylenebisstearylamide and metal soap; and flame retardants such as tetrabromophenol A, decabromophenol oxide, TBA epoxy oligomer, TBA polycarbonate oligomer and antimony trioxide.

If necessary, more desired physical properties and characteristics can be obtained by appropriately mixing the thermoplastic resin composition of the present invention with polyphenylene ether resin; polyamide resin; polycarbonate resin; vinyl copolymers such as polymethyl methacrylate (PMMA); polyolefin resins such as vinyl chloride resin, ABS resin, styrene resin, polyethylene and polypropylene; and olefin rubbers such as ethylene-propylene copolymer, ethylene-butene-1 copolymer, ethylene-propylene-dicyclopentadiene copolymer, ethylene-propylene-5-ethylidene-2-norbornene copolymer, ethylene-propylene-1,4-hexadiene copolymer, ethylene-vinyl acetate copolymer and ethylene-butyl acrylate copolymer.

The thermoplastic resin composition of the present invention is prepared by mixing the above essential components and, if necessary, arbitrary components in a predetermined amount and kneading the mixture using a conventional kneader such as roll, Banbury mixer, single-screw extruder or twin-screw extruder. The thermoplastic resin composition is preferably pelletized.

By using the thermoplastic resin composition thus obtained, it becomes possible to obtain a molded article, which has rigidity and high impact strength and is free from macroagglomerates of polytetrafluoroethylene and also has excellent surface characteristics, by various molding methods.

Examples of the method of processing the thermoplastic resin composition of the present invention include, but are not limited to, injection molding, calendering, blow molding, extrusion molding, thermoforming, foaming and melt spinning.

Examples of useful molded articles obtained from the thermoplastic resin composition of the present invention include, but are not limited to, injection molded articles, sheets, films, hollow molded articles, pipes, square bars, profile, thermoforms, foams and fibers.

EXAMPLES

In the following descriptions, "parts","%" are by weight unless otherwise specified. Various physical properties were measured by the following procedures.
(1) Solid content: The solid content was determined after drying a particle dispersion at 170° C. for 30 minutes.
(2) Particle size distribution: Using a sample solution prepared by diluting a particle dispersion with water, the particle size distribution was measured by a dynamic light scattering method (Model ELS800 manufactured by Otsuka Electronics Co., Ltd., temperature: 25° C., scatter angle: 90 degrees).
(3) Izod impact strength: Using test pieces (with a notch) having a thickness of 3.2 mm obtained by injection molding, the Izod impact strength was measured at 23° C. in accordance with ASTM D256.
(4) Flexural modulus: Using test pieces having a thickness of 6.4 mm obtained by injection molding, the flexural modulus was measured in accordance with ASTM D790.
(5) Heat deformation temperature: The heat deformation temperature was measured under a load of 1.820 MPa by the method defined in ASTM D648.
(6) Appearance: The appearance of the surface of each test piece obtained by injection molding was visually observed and the appearance was evaluated by the following criteria.
○: no lumpiness on the surface
X: lumpiness observed on the surface The following commercially available products were used as the thermoplastic resins (A-1, A-2), the rubber-like polymer (M-1) having an epoxy group and a portion of other materials.
Thermoplastic resin (A-1): polybutylene terephthalate resin ("Tafpet PBT N1000", manufactured by Mitsubishi Rayon Co., Ltd.)
Thermoplastic resin (A-2): polybutylene terephthalate resin ("Dianite PA210", manufactured by Mitsubishi Rayon Co., Ltd.) Rubber-like polymer (M-1) having an epoxy group: ethylene-glycidyl methacrylate copolymer ("Bond Fast E", manufactured by Sumitomo Chemical Industries Co., Ltd.)

<Preparation of Polytetrafluoroethylene-containing Mixed Powder (B-1)>

2.0 Parts of γ-methacryloyloxypropyldimethoxysilane and 98.0 parts of octamethylcyclotetrasiloxane were mixed to obtain 100 parts of a siloxane mixture. To the siloxane mixture, a solution prepared by dissolving 1 part of sodium dodecylbenzenesulfonate in 300 parts of distilled water was added and, after stirring in a homomixer at 10000 rpm for 2 minutes, the solution was passed twice through a homogenizer under a pressure of 30 MPa to obtain a stable pre-mixed organosiloxane latex. Separately, 10 parts of dodecylbenzenesulfonic acid and 90 parts of distilled water were charged in a separable flask equipped with a condenser and a stirring blade to prepare an aqueous 10% benzenesulfonic acid solution. While maintaining the resulting aqueous solution at 85° C., the stable pre-mixed organosiloxane latex was added dropwise over 2 hours and, after 3 hours have passed since the completion of the dropwise addition, the reaction solution was cooled. The resulting reduction product was allowed to stand at room temperature for 12 hours and then neutralized with an aqueous sodium hydroxide solution.

The silicone latex (L-1) thus obtained had a solid content of 18.1% and a weight-average particle diameter of 32 nm.

55.2 Parts of the silicone latex (L-1) was collected and charged in a separable flask equipped with a stirring blade, and then 149.8 parts of distilled water was added. After replacing the atmosphere in the separable flask with nitrogen and raising the temperature to 50° C., a mixed solution of 90 parts of n-butyl acrylate (BA), 0.045 parts of allyl methacrylate and 0.36 parts of cumene hydroperoxide was added. A mixed solution of 0.001 parts of ferrous sulfate, 0.003 parts of disodium ethylenediaminetetraacetate, 0.2 parts of Rongalite and 5 parts of distilled water was added and the radical polymerization was initiated, and then the mixture was maintained at an inner temperature of 50° C. for 2 hours to obtain a silicone-acrylic composite rubber latex (S-1).

The resulting rubber latex (S-1) had a solid content of 33.2% and the particle size distribution exhibited a single peak, and the weight-average particle diameter was 72 nm.

As the polytetrafluoroethylene particle dispersion, "Fluon AD936" manufactured by Asahi Fluoropolymers Co., Ltd. was used. "Fluon AD936" has a solid content of 63.0% and contains polyoxyethylene alkyl phenyl ether in an amount of 5 parts based on 100 parts of polytetrafluoloethylene. The particle size distribution of "Fluon AD936" exhibited a single peak and the weight-average particle diameter was 290 nm.

To 833 parts of "Fluon AD936", 1167 parts of distilled water was added to obtain a 26.2% polytetrafluoroethylene particle dispersion (F-1). The polytetrafluoroethylene particle dispersion (F-1) contains 25% polytetrafluoroethylene particles and 1.3% polyoxyethylene alkyl phenyl ether.

247 Parts of the composite rubber latex (S-1) was collected and charged in a separable flask equipped with a stirring blade. After replacing the atmosphere in the separable flask with nitrogen and raising the temperature to 60° C., a mixed solution of 8 parts of glycidyl methacrylate (GMA) and 0.04 parts of cumene hydroperoxide was added dropwise over 8 minutes. After the mixture was maintained at an inner temperature of 60° C. for one hour and 16 parts of a polytetrafluoroethylene particle dispersion (F-1) was added, a mixed solution of 10 parts of methyl methacrylate (MMA) and 0.05 parts of cumene hydroperoxide was added dropwise over 15 minutes, the mixture was maintained at an inner temperature of 60° C. for 2 hours and the radical polymerization was completed to obtain a latex of a polytetrafluoroethylene-containing mixed powder (B-1). The latex (B-1) thus obtained had a solid content of 37.0% and a weight-average particle diameter of 120 nm.

The latex (B-1) was added in an aqueous calcium chloride solution having a concentration of 2% at 40° C. so that a weight ratio of the latex to the aqueous solution was 1:2, and then solidified by heating to 90° C. After repeating the operation of washing with water, the solid component was separated and dried at 80° C. for 24 hours to obtain a dry latex powder (B-1).

Very thin slices obtained by forming the dry latex powder (B-1) into a strip using a pressing machine at 250° C. and cutting using a microtome were observed by a transmission electron microscope without staining. As a result, polytetrafluoroethylene was observed as the dark portion, and no agglomerate having a size of more than 10 μm was observed.

<Preparation of Polytetrafluoroethylene-containing Mixed Powders (B-2, B-3)>

In the same manner as in case of the preparation of the polytetrafluoroethylene-containing mixed powder (B-1), except that the amount of grycidyl methacrylate or methyl methacrylate to be added dropwise was set as shown in Table 1, dry polytetrafluoroethylene-containing mixed powders (B-2, B-3) were obtained.

Very thin slices obtained by forming the dry latex powders (B-2, B-3) into a strip using a pressing machine at 250°

C. and cutting using a microtome were observed by a transmission electron microscope without staining. As a result, polytetrafluoroethylene was observed as the dark portion, and no agglomerate having a size of more than 10 μm was observed.

<Preparation of Polytetrafluoroethylene-containing Mixed Powders (B-4, B-5)>

In the same manner as in case of the preparation of the polytetrafluoroethylene-containing mixed powder (B-1), except that the amount of (F-1) to be added in the preparation of the polytetrafluoroethylene-containing mixed powder (B-1) was set as shown in Table 1, dry polytetrafluoroethylene-containing mixed powders (B-4, B-5) were obtained.

Very thin slices obtained by forming the dry latex powders (B-4, B-5) into a strip using a pressing machine at 250° C. and cutting using a microtome were observed by a transmission electron microscope without staining. As a result, polytetrafluoroethylene was observed as the dark portion, and no agglomerate having a size of more than 10 μm was observed.

<Preparation of Rubber-like Polymer (M-2) Having an Epoxy Group>

In the same manner as in the case of the preparation of the polytetrafluoroethylene-containing mixed powder (B-1), except that (F-1) used in the preparation of the polytetrafluoroethylene-containing mixed powder (B-1) was not used, a dry powder of a rubber-like polymer (M-2) having an epoxy group was obtained.

TABLE 1

| Composition (Parts) | Si | BA | GMA | (F-1) | PTFE | MMA |
|---|---|---|---|---|---|---|
| B-1 | 8.2 | 73.8 | 8 | 16 | 4 | 10 |
| B-2 | 8.2 | 73.8 | 2 | 16 | 4 | 16 |
| B-3 | 8.2 | 73.8 | 10 | 16 | 4 | 8 |
| B-4 | 8.2 | 73.8 | 8 | 8 | 2 | 10 |
| B-5 | 8.2 | 73.8 | 8 | 32 | 8 | 10 |

Examples 1 to 8 and Comparative Examples 1 to 7

Thermoplastic resins (A-1, A-2) and a polytetrafluoroethylene-containing mixed powder were mixed in a mixing ratio shown in Table 2 and the mixture was extruded at a screw revolution speed of 200 rpm using a twin-screw extruder (Model ZSK30, manufactured by WERNER & PFLEIDERER CO) to prepare pelletized thermoplastic resin compositions.

Test pieces for measurement of various physical properties were made from the resulting thermoplastic resin compositions using an injection molding machine, and then the impact strength, the flexural modulus, the heat deformation temperature (HDT) and the appearance were evaluated. The results are shown in Table 2.

For comparison, thermoplastic resin compositions obtained by extruding only the thermoplastic resin (Comparative Examples 1 and 7), thermoplastic resin compositions mixed with M-1 (Comparative Examples 2 to 4), a thermoplastic resin composition mixed with M-2 (Comparative Example 5) and a thermoplastic resin composition mixed with a fine polytetrafluoroethylene powder (CD123, manufactured by Asahi ICI Co., Ltd.) (Comparative Example 6) were evaluated in the same manner. The results are shown in Table 3.

The cylinder temperature of the extruder and the injection molding machine was controlled to 240° C. for PBT and 280° C. for PET, while the die temperature was controlled to 80° C. for PBT and 120° C. for PET.

TABLE 2

| | Examples | | | | | | | |
|---|---|---|---|---|---|---|---|---|
| | 1 | 2 | 3 | 4 | 5 | 6 | 7 | 8 |
| Composition (Parts) | | | | | | | | |
| A-1 | 100 | 100 | 100 | 100 | 100 | 100 | 100 | |
| A-2 | | | | | | | | 100 |
| B-1 | 5 | 10 | 20 | | | | | 10 |
| B-2 | | | | 10 | | | | |
| B-3 | | | | | 10 | | | |
| B-4 | | | | | | 10 | | |
| B-5 | | | | | | | 10 | |
| M-1 | | | | | | | | |
| M-2 | | | | | | | | |
| CD123 | | | | | | | | |
| Impact strength (J/m) | 190 | 830 | 1300 | 790 | 810 | 800 | 800 | 580 |
| Flexural modulus (GPa) | 2.40 | 2.25 | 2.00 | 2.23 | 2.23 | 2.20 | 2.32 | 2.07 |
| HDT (° C.) | 61 | 58 | 52 | 56 | 56 | 55 | 59 | 57 |
| Appearance | ◯ | ◯ | ◯ | ◯ | ◯ | ◯ | ◯ | ◯ |

TABLE 3

| | Comparative Examples | | | | | | |
|---|---|---|---|---|---|---|---|
| | 1 | 2 | 3 | 4 | 5 | 6 | 7 |
| Composition (Parts) | | | | | | | |
| A-1 | 100 | 100 | 100 | 100 | 100 | 100 | |
| A-2 | | | | | | | 100 |
| B-1 | | | | | | | |
| B-2 | | | | | | | |
| B-3 | | | | | | | |
| B-4 | | | | | | | |
| B-5 | | | | | | | |
| M-1 | | 5 | 10 | 20 | | | |
| M-2 | | | | | 10 | 10 | |
| CD123 | | | | | | 1 | |
| Impact strength (J/m) | 34 | 90 | 140 | 490 | 150 | 150 | 29 |
| Flexural modulus (GPa) | 2.59 | 2.00 | 1.84 | 1.61 | 2.03 | 2.04 | 2.40 |
| HDT (° C.) | 65 | 55 | 51 | 40 | 54 | 54 | 65 |
| Appearance | ◯ | ◯ | ◯ | ◯ | ◯ | X | ◯ |

Example 9 and Comparative Example 8

100 Parts of 6,6 nylon (UBE 66 Nylon 2020B, manufactured by UBE INDUSTRIES, LTD.) as a thermoplastic resin and 15 parts of the polytetrafluoroethylene-containing mixed powder B-2 were mixed and the mixture was pelletized at a cylinder temperature of 250° C. using a twin-screw extruder (Model ZSK30, manufactured by WERNER & PFLEIDERER CO). After drying the resulting pellets, test pieces for measurement of various physical properties were made from the dried pellets at the cylinder temperature of 260° C. and the die temperature of 75° C. using an injection molding machine, and then the impact strength, the flexural modulus, the heat deformation temperature and the appearance were evaluated. The heat deformation temperature was measured under a load of 0.455 MPa.

For comparison, 6,6 nylon alone was evaluated. The results are shown in Table 4.

TABLE 4

| | Example 9 | Comparative Example 8 |
|---|---|---|
| 6,6 nylon (Parts) | 100 | 100 |
| B-2 (Parts) | 15 | — |
| Impact strength (J/m) | 460 | 48 |
| Flexural modulus (GPa) | 2.35 | 2.85 |
| Heat deformation temperature (° C.) | 221 | 230 |
| Appearance | ◯ | ◯ |

Example 10 and Comparative Example 9

100 Parts of polyphenylene sulfide (Tohprene T-4, manufactured by Tohprene Ltd.) as a thermoplastic resin and 15 parts of the polytetrafluoroethylene-containing mixed powder B-1 were mixed and the mixture was pelletized at a cylinder temperature of 300° C. using a twin-screw extruder (Model ZSK30, manufactured by WERNER & PFLEIDERER CO). After drying the resulting pellets, test pieces for measurement of various physical properties were made from the dried pellets at the cylinder temperature of 300° C. and the die temperature of 140° C. using an injection molding machine, and then the impact strength, the flexural modulus, the heat deformation temperature and the appearance were evaluated.

For comparison, polyphenylene sulfide (Tohprene T-4, manufactured by Tohprene Ltd.) alone was evaluated. The results are shown in Table 5.

TABLE 5

| | Example 10 | Comparative Example 9 |
|---|---|---|
| Polyphenylene sulfide (Parts) | 100 | 100 |
| B-1 (Parts) | 15 | — |
| Impact strength (J/m) | 410 | 35 |
| Flexural modulus (GPa) | 2.75 | 3.20 |
| Heat deformation temperature (° C.) | 109 | 120 |
| Appearance | ◯ | ◯ |

Industrial Applicability

The thermoplastic resin composition of the present invention can be used for various purposes because it exhibits a high impact strength by the addition of a small amount of a rubber and is also superior in surface characteristics of the resulting molded article.

The present invention may be embodied in other specific forms without departing from the spirit or essential characteristics thereof. The present embodiment is therefore to be construed in all respects as illustrative and not restrictive, the scope of the present invention being indicated by the appended claims rather than by the foregoing description and all changes which fall within the meaning and range of equivalency of the claims are therefore intended to be embraced therein.

What is claimed is:

1. A thermoplastic resin composition comprising a thermoplastic resin (A) and a polytetrafluoroethylene-containing mixed powder (B) comprising:
    a polytetrafluoroethylene (b1) having a particle diameter of 10 μm or less and
    an organic polymer (b2),
    wherein the polytetrafluoroethylene-containing mixed powder (B) is mixed so that the amount of a polytetrafluoroethylene component is from 0.0001 to 20 parts by weight based on 100 parts by weight of the thermoplastic resin (A), and
    the organic polymer (b2) is a polyorganosiloxane graft copolymer which is prepared by graft-polymerizing a composite rubber comprising a polyorganosiloxane rubber and a polyalkyl (meth)acrylate rubber with one or more vinyl monomers containing at least one epoxy group-containing vinyl monomer.

2. The thermoplastic resin composition according to claim 1, wherein the thermoplastic resin (A) comprises, as a main component, one or more thermoplastic resins selected from the group consisting of polyester resin, polyamide resin, polyarylene sulfide resin, and polyolefin resin.

3. A polytetrafluoroethylene-containing mixed powder comprising a polytetrafluoroethylene having a particle diameter of 10 µm or less and an organic polymer, wherein the organic polymer is a polyorganosiloxane graft copolymer which is prepared by graft-polymerizing a composite rubber comprising a polyorganosiloxane rubber and a polyalkyl (meth)acrylate rubber with one or more vinyl monomers containing at least one epoxy group-containing vinyl monomer.

4. A thermoplastic resin composition comprising a thermoplastic resin (A) and a polytetrafluoroethylene-containing mixed powder (B) consisting of a polytetrafluoroethylene (b1) having a particle diameter of 10 µm or less and an organic polymer (b2), wherein the polytetrafluoroethylene-containing mixed powder (B) is mixed so that the amount of a polytetrafluoroethylene component is from 0.0001 to 20 parts by weight based on 100 parts by weight of the thermoplastic resin (A), and the organic polymer (b2) is a rubber-like polymer having an epoxy group.

5. A thermoplastic resin composition comprising a thermoplastic resin (A) and a polytetrafluoroethylene-containing mixed powder (B) consisting of a polytetrafluoroethylene (b1) having a particle diameter of 10 µm or less and an organic polymer (b2), wherein the polytetrafluoroethylene-containing mixed powder (B) is mixed so that the amount of a polytetrafluoroethylene component is from 0.0001 to 20 parts by weight based on 100 parts by weight of the thermoplastic resin (A), and the organic polymer (b2) is a polymer having an epoxy group; wherein the thermoplastic resin (A) is at least one or more thermoplastic resins selected from the group consisting of polyester resin, polyamide resin, polyarylene sulfide resin, and polyolefin resin.

6. The thermoplastic resin composition according to claim 5, wherein the organic polymer is a polyorganosiloxane graft copolymer which is prepared by graft polymerizing a composite rubber comprising a polyorganosiloxane rubber and a polyalkyl (meth)acrylate rubber with one or more vinyl monomers containing at least one epoxy group containing vinyl monomer.

* * * * *